April 30, 1946.  C. F. RAMSEYER  2,399,450
SUPERHEATING GASES
Filed Oct. 19, 1943
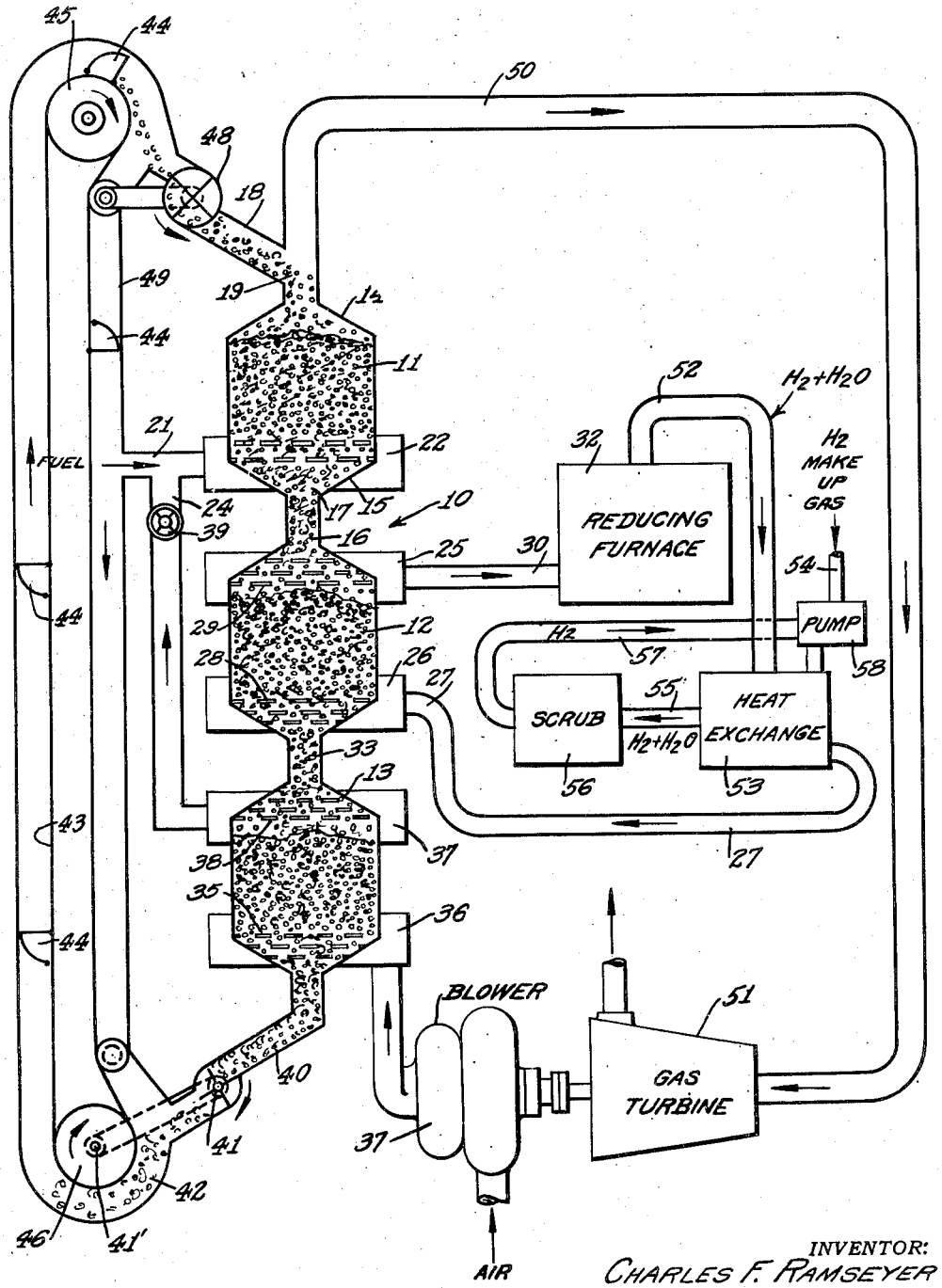
INVENTOR:
CHARLES F. RAMSEYER
BY
ATTORNEYS Patented Apr. 30, 1946

2,399,450

UNITED STATES PATENT OFFICE 2,399,450

SUPERHEATING GASES

Charles F. Ramseyer, Old Greenwich, Conn., assignor to H. A. Brassert & Company, New York, N. Y., a corporation of Illinois Application October 19, 1943, Serial No. 506,838

15 Claims. (Cl. 263—15)

This invention relates to heating gases and vapors and has particular reference to superheating combustible or reducing gases preparatory to using them for directly reducing metallic oxides, although the invention is not limited to that use.

The invention is directed to continuous methods and apparatus for recovering the sensible heat of the gases of combustion and the like, used to superheat a gas which already has a relatively high temperature, such as a processing gas which is recirculated to a reaction chamber or the like, for continuing an operation at higher temperature, with or without intermediate reformation, rectification or purification steps.

In accordance with the invention, the processing or other gas to be superheated is passed countercurrently to a flow of preheated elements, preferably ceramic balls or pebbles, which accordingly transfer most of their sensible heat to the gas, the elements being heated in a combustion zone prior to their passage through the superheating chamber, and also being used subsequent thereto to preheat the combustion air supplied to the element preheating combustion zone, before the elements themselves are returned to the combustion zone for reheating. A pressure slightly higher than the pressure in the combustion zone and air preheating zone is ordinarily maintained in the gas superheating zone in order to preclude substantial mixing of the combustion gases and air with the superheated processing gas, which is usually a combustible gas, so that the small amount of gas that bleeds into the combustion and preheating zones, by reason of the differential pressure, is burned in the former and thus its thermal values are recovered. However, in special cases it might be desirable to bleed a certain amount of air or flue gases into the processing gas, as for instance in a fixed nitrogen plant, to add the necessary $N_2$ to a hydrogen or hydrogen forming gas.

The preferred apparatus according to the invention consists essentially of three vertically arranged chambers connected in series by restricted tubes. The upper chamber comprises the combustion chamber for heating the elements, in which a suitable gas, oil, or other fuel is burned for the purpose. The middle chamber is fitted with a lower, usually annular, intake bubble pipe or chamber and similar upper discharge pipe by means of which the gas to be superheated is circulated upwardly through the middle chamber so as to flow countercurrently through and around the stream of heated elements flowing by gravity from the upper chamber through the discharge tube connecting the middle chamber with the lower chamber. Atmospheric air is pumped through the lower chamber countercurrently to the elements falling therethrough, and the resulting preheated air is supplied to the upper chamber to support combustion therein. The cooled elements discharged by gravity from the lower, air preheating chamber are returned to the combustion zone by an elevator and discharged into the upper end thereof so as to move countercurrently downward through the flue gases leaving the combustion chamber, so that the elements are preheated before reaching the combustion zone for high temperature reheating. Preheating of the elements in the flue gases issuing from the upper chamber causes the flue gases to be cooled down to a low temperature so that the heat loss from the system is very low. The pressure, and also to a degree the residual heat, of the flue gases may be employed in a gas turbine for driving the blower supplying air under pressure to the lower chamber, as described.

As indicated, the pressure in the middle chamber in which the gas is being superheated is ordinarily maintained slightly in excess of the pressure in the combustion chamber and the lower or air preheating chamber, so as to preclude mixing of the combustion gases and air therein respectively with the process gas, which is usually combustible, such as hydrogen, and thus a small amount of it bleeds through the column of entering elements into the combustion chamber where it is burned, and into the air preheating chamber where it either burns or is returned to the combustion chamber, so that the small loss of processing gas is in part at least compensated by the recovery of its sensible heat and its heat of combustion. If the gas being superheated is used in a cyclic process, as would be the case when using hydrogen for the reduction of ores, a certain proportion of the gas in the cycle has to be bled off continuously in any case in order to maintain its reducing strength by removing the continuously accumulating inert impurities. The elevator is sealed and maintained under a pressure which is the average of that in the upper and lower chambers, so that there is little danger of leakage, and the entire system is sealed. Any leakage that should occur would be harmless, as it would be merely between cooled flue gas and cold air.

It will be seen that the method and apparatus of this invention provide a very simple, compact, continuous and efficient means for superheating gas used for the direct reduction of metallic oxides, and the like, and thus makes unnecessary the usual large and cumbersome stoves or regenerators that require intermittent operation and considerable maintenance, labor and expense. Although well adapted for superheating combustible gases already at an elevated temperature, it is equally well adapted to superheating noncombustible gases, such as preheated feed air for blast and other furnaces, and vapors such as steam, oil, and the like.

For a more complete understanding of the invention, reference may be had to the accompanying drawing, showing a diagrammatic representation of the apparatus of this invention for practicing the method of this invention. In the drawing, numeral 10 designates the gas superheating apparatus of this invention, comprising essentially a combustion chamber 11, gas superheating chamber 12, and air preheating chamber 13, all vertically arranged. The combustion chamber 11 is preferably cylindrical in shape, with conical upper and lower portions 14 and 15, respectively, the latter acting as a hopper, discharging into tube 16 connecting combustion chamber 11 with the gas superheating chamber 12.

The heat transferring balls or pebbles 17, preferably of ceramic material of sufficient physical strength to withstand the friction and impact to which they are subjected, are discharged by chute 18 into a vertical uptake pipe 19 leading from the upper cone 14 of the combustion chamber 11. The heating elements 17 entering chamber 11 through pipe 19 by gravity are separated and distributed throughout the chamber 11. The fuel burned in combustion chamber 11 is supplied by pipe 21 to a bustle ring 22 encircling the lower portion of the combustion chamber 11 and communicating therewith through slots 23 or other apertures of sufficiently small dimensions to preclude unintended escape of the elements into the bustle ring 22. The fuel supplied by pipe 21 may be a suitable fuel gas, such as illuminating, natural, coke oven, or other gas, or fuel may be oil, or a mixture of gas and oil, or the ash-free flame from a cyclone type pulverized fuel burner, or the like, the combustion thereof, which takes place principally in ring 22, being sustained by air supplied by pipe 24. Accordingly, as the elements 17 descend through the hot gases in chamber 11 and collect in the exteriorly heated hopper 15, they are heated to a high temperature, say 2200° F., the temperature in the combustion chamber 11 being maintained at about 2700° F. for that purpose.

The heated elements 17 collecting in the hopper 15 of the combustion chamber 11 continue their gravity flow through connecting tube 16 into the upper portion of the gas superheating chamber 12 which preferably is constructed similarly to combustion chamber 11 except that an upper gas discharging bustle ring 25 is provided in addition to the lower gas receiving bustle ring 26. The process gas to be preheated is supplied to bustle ring 26 by pipe 27, and issues therefrom at the periphery of the chamber 12 through slots 28 in the walls thereof, these slots being so dimensioned as to preclude unintended discharge of the elements therefrom. Similarly, the upper bustle ring 25 communicates with the interior of chamber 12 through slots 29 in the walls thereof. Accordingly, the gas to be preheated is distributed throughout the chamber 12 and flows upwardly therethrough to discharge through openings 29 into bustle ring 25 from which it flows through pipe 30.

The hot ceramic elements descend by gravity into chamber 12 countercurrently through the upwardly flowing process gas to be preheated, during which time the major proportion of the sensibe heat of the elements is transferred to the gas, which is accordingly superheated from its initial temperature of about 600 to 700° F. so as to enter the reducing furnace 32 or other processing apparatus to which it is to be supplied at a temperature of 1100 to 1300° F. The temperature of the elements as they enter the chamber 12 is approximately 2000° F., and the temperature of the elements as they leave chamber 12 is approximately 850° F.

The heating elements 17 are discharged from preheating chamber 12 through tube 33 leading into air-preheating chamber 13, also having a shape similar to chambers 11 and 12. The air to be preheated in chamber 13 flows countercurrently to the descending elements, being supplied to chamber 13 through slots 35 leading from bustle ring 36 to which it is supplied under pressure by a blower 37. After being preheated in chamber 13 to a temperature of about 650° F., the air flows into upper bustle ring 37 through slots 38 in the walls of chamber 13 and may be used to support combustion in the combustion chamber 11. Accordingly, pipe 24 supplying such air is connected to bustle ring 37 as shown. A throttle valve 39 is preferably placed in preheated air supply pipe 24 for regulating the volume of the air supplied to the combustion chamber 11 in a manner readily understood.

After the heating elements 17 have transferred a substantial proportion of their residual heat to the air in preheating chamber 13, and have been cooled down to about 300° F. by the cold air, they are transferred by chute 40 to an elevator 42 at a predetermined rate by a star wheel type of feeder 41 driven from elevator sprocket 41'. Elevator 42 may be of any suitable construction for elevating the elements to the chute 18 leading into the combustion chamber 11. For example, the elevator may be of the chain and bucket type, comprising a chain 43 carrying buckets 44 and passing over upper and lower sprockets 45 and 46, respectively, being driven from a suitable source of power, not shown. Accordingly, as the cooled ceramic elements are discharged from air preheating chamber 13 through chute 40 and feeder 41, they are transferred to the buckets 44 of the elevator 42, and carried upwardly to be discharged into chute 18, whose star wheel feeder 48 feeds the elements 17 at a predetermined rate to pipe 19 of chamber 11 for recycling through chambers 11, 12 and 13 to repeat the cycle. Elevator 42 is enclosed in a housing 49 and joints between housing 49 and chutes 18 and 40 are also sealed so that the entire system, including chambers 11, 12 and 13, and chutes 18 and 40 and elevator housing 49 constitute a sealed system. It will be observed that feeders 41 and 48 also act as seals, so that the pressure in housing 49 is the average of that in chambers 11 and 13.

The chute 18 discharges the ceramic elements 17 into and through the flue gas issuing through pipe 19 from combustion chamber 11, and accordingly the ceramic elements 17 are preheated from a temperature of about 250° F. at which they are discharged into pipe 19, and the flue gas is cooled down to a temperature of approximately 250 to 350° F., at which it issues from pipe 19 into pipe 50, and accordingly its temperature is sufficiently reduced so that the thermal loss is kept very low. The warm flue gas under pressure may be used in a gas turbine 51 for operating the air blower 37, which may be a multi-stage turbo blower or compressor.

Although not limited to use in connection with a reducing furnace, the invention may be conveniently employed therewith for the purpose of heating the reducing gas used therein. The reducing furnace 32 may be of any desired construction, for example, such as that illustrated in copending application Serial No. 481,968, filed April 6, 1943, by Brassert and Ramseyer, and is preferably maintained under substantial superatmospheric pressure, such as 200 to 250 pounds per square inch. Accordingly, the gas superheating system of this invention is also operated under substantially superatmospheric pressure. The reducing gas may be hydrogen, which is supplied to the reducing furnace in an amount exceeding that necessary for theoretical reduction of the metallic oxides and the consequent gaseous products of the reducing operation discharged from the furnace 32 by pipe 52 constitute a mixture of hydrogen and water vapor. The residual sensible heat of the gaseous products of the reduction may be utilized in a heat exchanger 53 to preheat recirculated and the make-up hydrogen supplied by pipe 54 from a gas holder or generator, not shown. The hot reducing gas and water vapor mixture is supplied to heat exchanger 53 from furnace 32 by pipe 52 and then by pipe 55 to a suitable scrubber 56 or other apparatus, for removing the water vapor from the gases, thereby leaving substantially pure hydrogen, which is returned by pipe 57 to pump 58 which forces it through heat exchanger 53 and pipe 27 to superheating chamber 12. The preheated make-up hydrogen is added to the recirculated hydrogen by pump 58, which is used to maintain the entire reduction system under pressure.

In order to preclude mixing of the gaseous products of combustion in chamber 11 and the air being preheated in chamber 13 with the hydrogen in superheating chamber 12, the air in chamber 13 and the gas in chamber 11 are maintained under a superatmospheric pressure, which is silghtly less than the pressure of the hydrogen in preheating chamber 12, so that the hydrogen tends to flow outwardly from chamber 12 through tubes 33 and 16. Inasmuch as the pressure of hydrogen in superheating chamber 12, and the reducing system generally is maintained at approximately 250 pounds per square inch, the pressure in chambers 11 and 13 is maintained slightly under 250 pounds per square inch, with the air preheating chamber 13 under a slightly higher pressure than the combustion chamber 11, owing to loss of pressure in pipe 24 between chamber 13 and chamber 11, although the expanding gases in combustion chamber 11 tend to equalize the difference in pressure between chambers 13 and 11, as will be readily understood. In any event, it is preferable to have more gas flow from chamber 12 into cmobustion chamber 11 than from the former into air preheating chamber 13, since the hydrogen is combustible and is burned in combustion chamber 11, although hydrogen which bleeds into air chamber 13 either burns or is carried by the air to the combustion chamber 11 through pipe 24. It will be observed that the tubes 16 and 33 are substantially always filled with the ceramic elements 17 and to a degree provide a form of seal between chambers 11 and 13 and superheating chamber 12. Also, inasmuch as the elevator housing 49 connected to combustion chamber 11, and air preheating chamber 13, and has no connection with superheating chamber 12, there can be no leakage of the reducing gas by way of the elevator. The whole system, being sealed, may be kept under the average system pressure.

The flue gas issuing from combustion chamber 11 is under pressure of approximately 230 pounds per square inch, and consequently is effective for driving gas turbine 51 which operates blower 37 to supply air at the indicated pressure to chamber 13.

Operation of the system of this invention will be readily understood from the foregoing description, and it will be apparent that it has numerous uses for superheating or preheating gases, vapors, or mixtures of gases and vapors employed in various arts. Although a preferred embodiment of the invention is illustrated and described herein, it is not limited thereby, but is susceptible of changes in form and detail within the scope of the appended claims.

I claim:

1. The method of heating a gas with recirculated hot elements, which comprises heating the elements in a combustion zone, feeding the heated elements countercurrently to a stream of the gas to be heated thereby in a heating zone, discharging the cooled elements from the gas heating zone into a stream of air to further cool the elements and preheat the air, supplying the preheated air to the combustion zone, and returning the cooled elements to the combustion zone for reheating to repeat the cycle.

2. The method of heating a gas with recirculated hot elements, which comprises heating the elements in a combustion zone, feeding the heated elements countercurrently to a stream of the gas to be heated thereby in a heating zone, discharging the cooled elements from the gas heating zone into a stream of air to further cool the elements and preheat the air, supplying the preheated air to the combustion zone, returning the cooled elements to the combustion zone for reheating to repeat the cycle, and maintaining the gas in the heating zone at a pressure in excess of the pressure in the combustion and preheating zones to preclude entry of combustion gases and air into said gas heating zone.

3. The method of heating a gas with recirculated hot elements, which comprises heating the elements in a combustion zone, feeding the heated elements countercurrently to a stream of the gas to be heated thereby in a heating zone, discharging the cooled elements from the gas heating zone into a stream of air to further cool the elements and preheat the air, supplying the preheated air to the combustion zone, returning the cooled elements to the combustion zone for reheating to repeat the cycle, and maintaining the entire system under superatmospheric pressure.

4. The method of heating a gas with recirculated hot elements, which comprises heating the elements in a combustion zone, feeding the heated elements countercurrently to a stream of the gas to be heated thereby in a heating zone, discharging the cooled elements from the gas heating zone into a stream of air to further cool the elements and preheat the air, supplying the preheated air to the combustion zone, returning the cooled elements to the combustion zone for reheating to repeat the cycle, maintaining the entire system under superatmospheric pressure, and maintaining the gas in the gas heating zone at a higher superatmospheric pressure than the remainder of the system to preclude entry of the combustion gases and air into said gas heating zone.

5. The method of heating a gas with recirculated hot elements, which comprises heating the elements in a combustion zone, feeding the heated elements countercurrently to a stream of the gas to be heated thereby in a heating zone, discharging the cooled elements from the gas heating zone into a stream of air to further cool the elements and preheat the air, supplying the preheated air to the combustion zone, returning the cooled elements to the combustion zone for reheating to repeat the cycle, maintaining the entire system under superatmospheric pressure, utilizing the resulting superatmospheric pressure of the flue gases from the combustion zone to operate an expansion engine, and operating a compressor for supplying said air to said air preheating zone under said superatmospheric pressure.

6. The method of superheating a hot combustible reagent gas with recirculated hot elements, which comprises heating the elements in a combustion zone, feeding the heated elements to a superheating zone, circulating the hot gas through said superheating zone countercurrently to the flow of said elements therethrough to superheat the gas by contact therewith, discharging the cooled elements from the gas superheating zone into a stream of air to further cool the elements and preheat the air, supplying the preheated air to the combustion zone, returning the cooled elements to the combustion zone for reheating the same to repeat the cycle, maintaining the gas in the superheating zone at a pressure in excess of that in the combustion and air preheating zones, and burning in the combustion zone the combustible gas bleeding from said superheating zone to said combustion and air preheating zones as the result of said excess pressure.

7. The method of superheating a hot combustible reagent gas with recirculated hot elements, which comprises heating the elements in a combustion zone, feeding the heated elements to a superheating zone, circulating the hot gas through said superheating zone countercurrently to the flow of said elements therethrough to superheat the gas by contact therewith, discharging the cooled elements from the gas superheating zone into a stream of air to further cool the elements and preheat the air, supplying the preheated air to the combustion zone, returning the cooled elements to the combustion zone for reheating the same to repeat the cycle, supplying the superheated gas from said superheating zone to a reaction zone in excess of that required for the reaction, recovering the excess gas from the spent gaseous products of the reaction, adding make-up reagent gas to said recovered gas, and returning the said reagent gas to said superheating zone.

8. The method of superheating a hot combustible reagent gas with recirculated hot elements, which comprises heating the elements in a combustion zone, feeding the heated elements to a superheating zone, circulating the hot gas through said superheating zone countercurrently to the flow of said elements therethrough to superheat the gas by contact therewith, discharging the cooled elements from the gas superheating zone into a stream of air to further cool the elements and preheat the air, supplying the preheated air to the combustion zone, returning the cooled elements to the combustion zone for reheating the same to repeat the cycle, supplying the superheated gas from said superheating zone to a reaction zone in excess of that required for the reaction, recovering the excess gas from the spent gaseous products of the reaction, adding make-up reagent gas to said recovered gas, returning the said reagent gas to said superheating zone, maintaining the reagent gas in the superheating zone at a pressure in excess of that in the combustion and air preheating zones, and burning in the combustion zone the reagent gas bleeding from said superheating zone as the result of said excess pressure, whereby leakage of the combustion gases and air into said superheating zone is precluded and the sensible heat and thermal value of said leakage reagent gas is recovered.

9. The method of superheating a hot combustible reagent gas with recirculated hot elements, which comprises heating the elements in a combustion zone, feeding the heated elements to a superheating zone, circulating the hot gas through said superheating zone countercurrently to the flow of said elements therethrough to superheat the gas by contact therewith, discharging the cooled elements from the gas superheating zone into a stream of air to further cool the elements and preheat the air, supplying the preheated air to the combustion zone, returning the cooled elements to the combustion zone for reheating the same to repeat the cycle, supplying the superheated gas from said superheating zone to a reaction zone in excess of that required for the reaction, recovering the excess gas from the spent gaseous products of the reaction, adding make-up reagent gas to said recovered gas, returning the said reagent gas to said superheating zone, maintaining the entire system under superatmospheric pressure, and maintaining the pressure of said reagent gas in the superheating zone at a pressure in excess of said superatmospheric pressure to preclude entry of combustion gases and air from said combustion and air preheating zones, respectively.

10. In a continuous gas heating system of the recirculated heated refractory element type, the combination of a combustion chamber for heating the elements, a second chamber for heating the gas, conduit means between the said chambers for conducting the elements to said second chamber for flow therethrough, gas supply and discharge means leading to and from said second chamber for flow of said gas therethrough countercurrently to the flow of the elements therethrough, a third chamber connected to said second chamber for receiving said elements therefrom, air supply means leading to said first chamber through said third chamber for supplying preheated combustion supporting air to said first chamber, and transfer mechanism for returning said elements from said third chamber to said first chamber for reheating the same to repeat the cycle.

11. In a continuous gas heating system of the recirculated heated refractory element type, the combination of a combustion chamber for heating the elements, a second chamber for heating the gas, conduit means between the said chambers for conducting the elements to said second chamber for flow therethrough, gas supply and discharge means leading to and from said second chamber for flow of said gas therethrough countercurrently to the flow of the elements therethrough, a third chamber connected to said second chamber for receiving said elements therefrom, and supply means leading to said first chamber through said third chamber for supplying preheated combustion supporting air to said first chamber, transfer mechanism for returning said elements from said third chamber to said first chamber for reheating the same to repeat the cycle, and pressure means maintaining a higher pressure in said second chamber than in said first and third chambers, to preclude entry of combustion gases and air from said first and third chambers into said second chamber.

12. In a continuous gas heating system of the recirculated heated refractory element type, the combination of a combustion chamber for heating the elements, a second chamber for heating the gas, conduit means between the said chambers for conducting the elements to said second chamber for flow therethrough, gas supply and discharge means leading to and from said second chamber for flow of said gas therethrough countercurrently to the flow of the elements therethrough, a third chamber connected to said second chamber for receiving said elements therefrom, air supply means leading to said first chamber through said third chamber for supplying preheated combustion supporting air to said first chamber, elevator mechanism for returning said elements from said third chamber to said first chamber for reheating the same to repeat the cycle, an enclosure for said elevator, whereby said three chambers, the connections therebetween and said elevator enclosure constitute a closed system, a pump connected to said air supply means for maintaining said first and third chambers and air supply means under superatmospheric pressure, and a pump connected to said gas supply means for maintaining the pressure in said second chamber in excess of said superatmospheric pressure in said first and third chambers to preclude entry of combustion gases and air therefrom into said second chamber.

13. In a continuous gas heating system of the recirculated heated refractory element type, the combination of a combustion chamber for heating the elements, a second chamber for heating the gas, conduit means between the said chambers for conducting the elements to said second chamber for flow therethrough, gas supply and discharge means leading to and from said second chamber for flow of said gas therethrough countercurrently to the flow of the elements therethrough, a third chamber connected to said second chamber for receiving said elements therefrom, air supply means leading to said first chamber through said third chamber for supplying preheated combustion supporting air to said first chamber, elevator mechanism for returning said elements from said third chamber to said first chamber for reheating the same to repeat the cycle, an enclosure for said elevator, whereby said three chambers, the connections between them and said elevator enclosure constitute a closed system, a pump connected to said air supply means for maintaining said system under superatmospheric pressure, an expansion engine for driving said pump, and means for supplying the combustion gases from said combustion chamber under said superatmospheric pressure to said engine for driving the same.

14. In a continuous gas heating system of the recirculated heated refractory element type, the combination of a combustion chamber for heating the elements, a second chamber for heating the gas, conduit means between the said chambers for conducting the elements to said second chamber for flow therethrough, gas supply and discharge means leading to and from said second chamber for flow of said gas therethrough countercurrently to the flow of the elements therethrough, a third chamber connected to said second chamber for receiving said elements therefrom, air supply means leading to said first chamber through said third chamber for supplying preheated combustion supporting air to said first chamber, transfer mechanism for returning said elements from said third chamber to said first chamber for reheating the same to repeat the cycle, apparatus for utilizing said gas, connections between said gas discharged means and said apparatus, connections between said apparatus and said gas supply means for returning the unused portion of said gas to said second chamber, and means for adding make-up gas to said second chamber to compensate for the gas used in said apparatus.

15. In a continuous system for superheating a reducing gas with heated refractory elements, the combination of a combustion chamber for heating the elements, means for supplying fuel to said chamber, a second chamber for superheating the reducing gas, conduit means between said first and second chambers for conducting the elements to said second chamber for gravity flow therethrough, reducing gas supply and discharge means leading to and from said second chamber for circulating said gas upwardly therethrough and through said descending elements for heating the gas therewith, a third chamber for preheating air, conduit means between said second and third chambers for conducting the elements to said third chamber for gravity flow therethrough, air supply and discharge means leading to and from said third chamber for circulating said air upwardly therethrough and through said descending elements for heating the air therewith, a connection between said air discharge means and said first chamber for supplying preheated combustion supporting air thereto, an elevator, conduit means transferring said elements from said third chamber to said elevator, conduit means transferring said elements from said elevator to said first chamber for reheating therein, a reducing furnace, connections between said gas discharge means and said reducing furnace for supplying superheated reducing gas from said second chamber to said furnace, connections between said furnace and said gas supply means for returning said gas to said second chamber for superheating therein, means interposed in said last named connections for removing the spent reducing gas, and means for adding make-up reducing gas.

CHARLES F. RAMSEYER.

Certificate of Correction

Patent No. 2,399,450. April 30, 1946.

CHARLES F. RAMSEYER

It is hereby certified that error appears in the printed specification of the above numbered patent requiring correction as follows: Page 5, first column, line 1, claim 11, for the words "and supply" read *air supply*; and that the said Letters Patent should be read with this correction therein that the same may conform to the record of the case in the Patent Office.

Signed and sealed this 18th day of June, A. D. 1946.

[SEAL]

LESLIE FRAZER,
*First Assistant Commissioner of Patents.*